Nov. 22, 1938.  F. C. GEIBIG ET AL  2,137,801
METHOD OF FLAME MACHINING AND WELDING
Filed Jan. 12, 1935
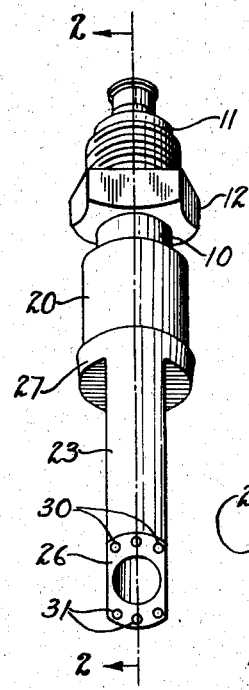
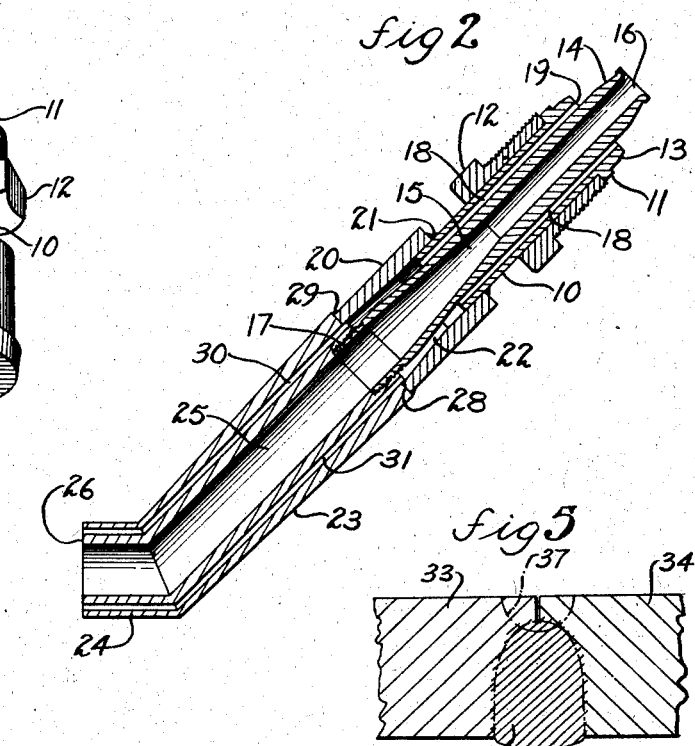
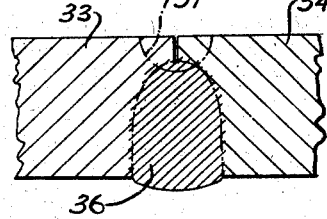
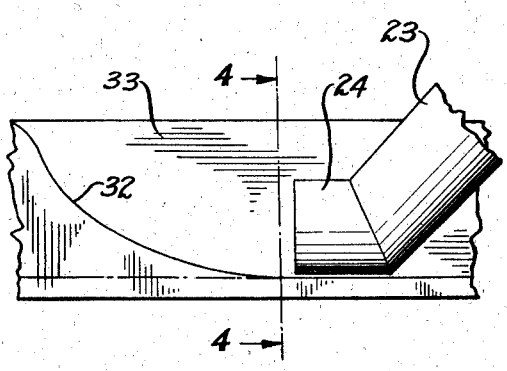
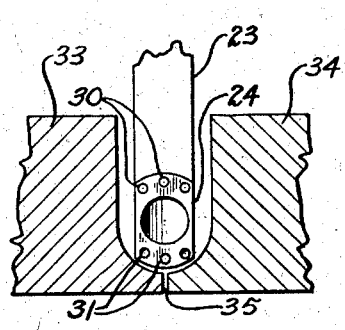
INVENTORS
FRANK C. GEIBIG
WILGOT J. JACOBSSON
BY
ATTORNEY Patented Nov. 22, 1938

2,137,801

UNITED STATES PATENT OFFICE 2,137,801

METHOD OF FLAME MACHINING AND WELDING

Frank C. Geibig, Westfield, and Wilgot J. Jacobsson, Elizabeth, N. J., assignors, by mesne assignments, to Union Carbide and Carbon Corporation, a corporation of New York Application January 12, 1935, Serial No. 1,492

11 Claims. (Cl. 113—112)

This invention relates to a method of flame machining in which metal at an ignition or kindling temperature is removed by progressively applying an oxidizing gas stream on successive portions of such metal, and to a method of welding plates and other structural shapes wherein such flame machining method is effectively utilized to prepare the contiguous edges to be joined.

It has generally been the practice to apply the oxidizing gas stream or streams at an acute angle to the surface from which metal is to be removed, as shown and described in United States Letters Patent No. 1,957,351, granted May 1, 1934 to Samuel R. Oldham. This method of removing surface metal is not entirely satisfactory for cutting a deep groove, and particularly where it is desired to produce a cut or groove at the interval or seam formed by two metallic bodies arranged adjacent to each other with a gap therebetween. When a cut or groove is made along such an abuttal or seam with the oxidizing gas stream applied at an acute angle to the surfaces of the adjacent metallic bodies, a large portion of the oxidizing gas passes through the gap without effecting any removal of metal. Moreover, the cutting that is accomplished at the seam in this manner is very irregular and not uniform and does not produce the desired groove. Removing metal in this manner is further objectionable because, when the tip of the nozzle is below the surface of the body in the groove or cut it is producing, an insufficient amount of metal is removed to provide clearance for the nozzle as it is moved relatively to the metallic body.

The objects of this invention are: To provide a method of flame machining for removing a relatively large amount of metal from a metallic body in a single pass; to provide such an improved method whereby relatively deep grooves or cuts can be produced in metallic bodies in one or a plurality of passes of an oxidizing gas stream; to provide such a method for producing a relatively deep groove along a seam formed by two metallic plates arranged adjacent to each other, such a groove being of practical value in uniting the plates by welding; to provide a welded joint in accordance with the present method in which an auxiliary groove is produced at the side of the plates opposite to that of the first groove produced, after the latter is partially or completely filled with weld metal, both grooves subsequently being completely filled with weld metal.

The above and other objects accomplished by the present method may be effectively carried out in practice by blowpipe apparatus embodying the nozzle illustrated in the accompanying drawing, in which:

Fig. 1 is an end view, in elevation, of the nozzle;

Fig. 2 is a longitudinal view, in section, taken at line 2—2 of Fig. 1;

Fig. 3 diagrammatically illustrates the relation of the nozzle with respect to a metallic surface in order to produce cuts according to the present method;

Fig. 4 is a view, in section, taken at line 4—4 of Fig. 3; and

Fig. 5 is a view, in section, of the plates shown in Fig. 4 after the groove produced is filled with weld metal and before an auxiliary groove is cut on the opposite side of the plates.

According to this invention, the desired deep groove in a thick metal plate, or one along the seam between abutted edges of two thick plates, is produced by applying an oxidizing gas stream progressively in the direction of the groove to be cut, while maintaining the axis of the stream, adjacent its point of issue from a nozzle, substantially parallel to the axis of the groove but below the surface of the plate and near the bottom of the groove. The metal to be removed in cutting the groove is preferably heated to an ignition or kindling temperature by suitable high-temperature combustible gas flames which are delivered by the same nozzle as the oxidizing gas stream and are applied on the metal to be removed concurrently with the latter.

It should be understood that the surface of metal to be removed can be heated in any suitable manner. For example, an electric arc may be utilized to preheat the surface metal to an ignition or kindling temperature; or the metallic body to be grooved may be first heated to a kindling temperature, as in a furnace, thereby entirely eliminating the high-temperature flames; and sometimes, when using high-temperature preheating flames and after the cutting has been started and is in progress, it is possible to partially or completely shut off these preheating flames and thereby effect an economy in gas consumption. In these conditions the oxidized metal or slag, which is driven forward and finally out of the groove by the force of the oxidizing gas stream, usually has sufficient residual heat to raise to a kindling temperature the portions of the metallic body successively exposed in front of the oxidizing gas stream, which portions then will be attacked by the oxidizing gas stream without the necessity of additional preheat. In many instances, however, it is desirable to apply heating flames during an entire flame machining operation so as to remove a greater amount of metal per cubic foot of oxidizing gas.

Although the metal removed can be reduced to a completely oxidized form, considerable economy can be effected in the amount of oxidizing gas used by removing a substantial portion of the metal without completely oxidizing it. The metal removed comprising either oxidized metal or a mixture of oxidized metal and fused or molten metal has been termed a "slag"; and such slag, blown ahead of a cut as it is being made, is reduced substantially to a non-adherent granular state.

Referring to the drawing, the nozzle for practicing the present method of flame machining may comprise a body portion 10 having a shoulder 11 at its inner end. An externally threaded clamping nut 12 disposed about the body 10 and bearing against the shoulder 11 is provided for securing the nozzle to a blowpipe head or adaptor (not shown), so that the tapered seating surfaces 13 and 14 will engage and form a gas-tight seal with similar seating surfaces in the blowpipe head, which supplies the oxidizing gas, such as oxygen or a mixture of oxygen and air, and a combustible gas mixture to the nozzle.

An oxidizing gas passage 15, having an inlet 16 communicating with a similar passage in the head, extends longitudinally through the body 10. For a short distance at its inlet end the passage 15 is substantially constant in area and non-expanding. From this non-expanding section the passage 15 gradually expands toward its outlet 17, at which outlet is formed a short non-expanding section that is externally threaded.

Disposed about the outer wall of the body is a group of passages 18 which are substantially equally spaced and which extend longitudinally thereof from an inlet 19 adjacent the seating surface 13 and terminate adjacent the expanding portion of the passage 15. A combustible gas, such as a mixture of oxygen and acetylene, is delivered through the passages 18.

Disposed about the outer end of the body 10 and spaced therefrom is a bushing 20 having one end thereof secured at 21, as by silver soldering, to the outer wall of the body adjacent the outlets of the passages 18. The space between the outer end of the body 10 and the bushing 20 forms an annular chamber 22 into which the combustible gas passes from the group of passages 18.

The inner end of a tip 23 is adapted to be connected to the outer end of the body 10 and the bushing 20. As shown, the tip 23 is rectangular in shape with flat side walls and arcuate-shaped top and bottom walls. At its outer end the tip is provided with a short section 24 which is at an angle to the main body portion of the tip.

A non-expanding passage 25 extends longitudinally of the tip from its inlet to the discharge orifice at the discharge face 26, bending at the juncture of the short section 24 and the main portion of the tip.

At its inlet the passage 25 is threaded for securing the tip 23 to the externally threaded outer section of the body 10. The extreme end of the threaded outer section of the body 10 is adapted to bear against a shoulder at the inlet of the passage 25, so that the cross sectional area of the passage 25 will be the same as that of the non-expanding outer section of the passage 15 with which it communicates. The inner end 27 of the tip is enlarged and circular and provided with a shoulder 28 adapted to bear against the outer end of the bushing 20 to which it may be secured, as by silver soldering, as indicated at 29.

At the diametrically opposite top and bottom walls of the tip 23 are two groups of passages 30 and 31, respectively, which extend longitudinally of the tip from its inlet to the discharge face 26, bending in a similar manner to the passage 25 at the juncture of the short section 24 and the main portion of the tip. The combustible gas passes from the annular chamber 22 through the passages 30 and 31 to produce gaseous heating jets or heating flames to heat the metal to be removed to an ignition temperature. The passages 30 and 31 in the section 24 may be parallel to the oxidizing gas passage 25, or the outer combustible gas passages may diverge toward the walls of a cut as it is being made.

In order to remove metal according to the present method with the above-described nozzle, the nozzle is arranged with respect to the metallic body so that the short section 24 is substantially parallel to and near the bottom of the cut or channel that is produced, as shown in Fig. 3. The oxidizing gas stream discharged from the tip of the nozzle is supplied in the direction of the successive portions from which metal is to be removed and is also substantially parallel to the surface and near the bottom of the cut.

The combustible gas issuing from the passages 30 and 31 heats the metal directly ahead of the nozzle to an ignition temperature, such metal being indicated at 32. The oxidizing gas contacting the heated metal causes the same to ignite and burn. This oxidation or burning of the metal takes place in a definite manner to produce a smooth and even channel.

The oxidizing gas sweeps over the heated metal and is deflected upwardly to the surface of the metallic body. This deflection of the oxidizing gas is caused by the metal underneath the metal at an ignition temperature, such first-mentioned metal being in a solid state, so that it acts as a baffle for the burned or oxidized metal which is swept out of the cut to the surface of the metallic body by the force of the oxidizing gas stream. The foregoing action takes place about the entire surface of the area impinged. For example, when the cut assumes the form of a deep groove, as shown in Fig. 4, the heating flames and oxidizing gas stream are applied on and attack the lower side walls as well as the metal directly ahead of the nozzle.

This burning or oxidation of sub-surface metal takes place progressively as each successive portion of heated metal is uncovered and exposed to contact with the oxidizing gas stream. When a cut is made in this manner at a seam formed between two adjacent metallic bodies 33 and 34 having a gap 35 therebetween, as shown in Fig. 4, substantially all of the oxidizing gas is effectively utilized to remove metal with only a negligible amount passing through the gap at the seam.

In starting a groove at the edge of a metallic body, the nozzle is positioned at the edge with the short section 24 at a depth below the surface substantially equal to the depth of the groove to be produced. Combustible gas is then supplied to the nozzle and the heating flames produced at the discharge face 26 will heat the surface of metal at the edge to an ignition temperature. Oxidizing gas is then supplied to the nozzle and the oxidizing gas stream produced is applied onto the heated metal at a distance below the surface equal to the depth of the groove to be produced. After sufficient metal has burned or oxidized at the edge to permit the nozzle to be moved relatively to the body, the heating flames and oxidizing gas stream are applied on successive portions, as described above.

By employing the nozzle illustrated in Figs. 1 and 2, the passage of a relatively large volume of oxidizing gas is insured. The passage 15 in the body 10 is provided with an expanding portion, for example, to increase the volume of oxidizing gas discharged from the discharge face. The expansion of the oxidizing gas in the passage 15 reduces the velocity of the oxidizing gas, such reduction in velocity being preferable although not absolutely necessary. The arrangement of the short section 24 of the tip at an angle to the main longitudinal portion thereof changes the direction of flow of the oxidizing gas so that the oxidizing gas stream produced is applied substantially parallel to the surface with only a portion of the tip extending below the surface.

It has been found that the short section 24 of the tip acts as a rapid expansion outlet for the oxidizing gas as it issues from the discharge face 26. This insures sufficient lateral flaring of the oxidizing gas stream to provide adequate clearance for the outer portion of the tip as it is moved relatively to the surface. By providing a tip having straight side walls instead of the usual circular nozzle tip (such side walls being produced by moving metal from diametrically opposite sides of a circular nozzle), sufficient clearance for the tip is insured for any grooving or flame machining operation encountered in practice.

A groove of the shape shown in Fig. 4 is of practical value in joining the plates 33 and 34 by welding. Since a relatively deep groove can be produced in a single pass of an oxidizing gas stream, considerable economy in labor and time is effected over machine tools heretofore employed to produce such grooves. When a very deep groove is desired, several passes of an oxidizing gas stream may be effected.

After such a groove is partially or completely filled with fused weld metal, as indicated at 36 in Fig. 5, the plates may be reversed and an auxiliary groove produced, in accordance with the present method, on the opposite side of the plates. The auxiliary groove may be made sufficiently deep so that the weld metal previously deposited will be exposed, as indicated by the dotted line 37 in Fig. 5. The auxiliary groove may then be filled with fused weld metal before or after the groove first produced is completely filled with weld metal. In joining plates in this manner the weld metal extends through the entire thickness of the plates. In some instances it may be preferable to make the auxiliary groove of such depth that the weld metal first deposited is not fully exposed. An exceptionally strong welded joint can be obtained according to the above-described method, particularly when the plates to be joined or united are relatively thick.

In practicing the present method of flame machining the plates or other structural shapes are preferably supported in a substantially horizontal plane, and the grooves or cuts may be produced on one or both sides of a plate. After a plate has once been suitably supported and it is desired to produce a groove or grooves on the under side thereof, such groove or grooves can readily be made by positioning the nozzle at the under side of the plate and moving the same relatively thereto.

Although it has been stated that the above-described method of flame machining is particularly suitable for producing cuts or grooves at seams formed by adjacent metallic bodies, it is to be understood that it is equally applicable to other flame machining applications where it is desired to remove metal from the surfaces of metallic bodies in accordance with the present method. Also, in welding plates, as described above, the present flame machining method may be employed to produce one or both of the grooves at a seam, the contour of the grooves being dependent upon the shape of the oxidizing gas stream and the particular velocity with which it is discharged from a nozzle.

We claim:

1. A method of removing metal from a metal body to produce a deep channel therein which comprises heating to ignition temperature a portion of the body to be removed, applying an oxidizing gas stream on such heated metal to effect a metal removing reaction, projecting said gas stream parallel to and near the bottom of the channel, and advancing said gas stream in the direction it is projected and relatively to said body in a direction toward the metal to be removed so as to impinge said stream against a retreating wall of metal extending from the bottom of the channel to the surface of the body and deflect the products of reaction outward.

2. A method of removing metal from a metal body to produce a deep channel therein which comprises applying a gaseous heating flame on a portion of the body to be removed to heat same to a temperature at which it will ignite in an oxidizing gas stream, applying an oxidizing gas stream on such heated metal to at least partially oxidize said metal and blow the same ahead in the form of a slag, projecting said gas stream parallel to and along the bottom of the channel, and advancing said gas stream relatively to said body in a direction toward the metal to be removed so as to impinge said stream against a retreating wall of metal extending from the bottom of the channel to one surface of the body and deflect the slag outward to the surface, said slag having sufficient heat to aid the removal of the portions of metal over which it is deflected.

3. A method of removing metal from a metal body to produce a deep channel therein which comprises heating to ignition temperature a portion of the body to be removed, applying an oxidizing gas stream having a velocity greater than 200 feet per second and less than 1000 feet per second on such heated metal to effect a metal removing reaction, directing said gas stream parallel to and along the bottom of the channel, and advancing said gas stream relatively to said body in a direction toward the metal to be removed so as to impinge said stream against a retreating wall of metal extending from the bottom of the channel to the surface of the body and deflect the products of reaction outward.

4. A method of removing metal from a metallic body to produce a channel therein, which comprises heating such metal at an edge of said body to an ignition temperature, said metal being heated to a depth substantially equal to the depth of the channel to be produced, and applying an oxidizing gas stream toward the edge of said body and onto said heated metal, said gas stream being directed parallel to the bottom of the channel and in alignment with the same and at a distance below the surface of the body substantially equal to the depth of the channel to be produced.

5. A method of removing metal to produce a U-shaped groove at an interval between two metallic bodies having opposing edges thereof arranged contiguously, such metal being at an ignition temperature when an oxidizing gas stream is applied thereon, which comprises applying on a portion of the metal to be removed an oxidizing gas stream, and advancing said gas stream relatively along the interval toward metal to be removed, directing said gas stream parallel to and along the bottom of the groove so as to impinge said stream against a retreating wall of metal extending from the bottom of the groove to an adjacent pair of surfaces of the bodies.

6. A method of producing a relatively deep substantially U-shaped groove in ferrous metal work which comprises heating to an ignition temperature the portion of the work to be grooved; delivering an oxidizing gas stream from a nozzle against one extremity of said portion at a distance below an adjacent surface of the work substantially equal to the depth of the proposed groove; and thereupon advancing said nozzle in a direction relatively to the work which maintains substantially parallel to the bottom of the proposed groove that part of the stream initially issuing from the nozzle; that part of the stream more remote from the nozzle impinging against, and flowing out of the groove along, a retreating wall of metal inclined outwardly toward said surface and away from the nozzle to sweep products of the operation out of the groove.

7. A method of channeling a relatively thick ferrous metal plate to produce therein, in a single pass, a groove having a greater depth than width, such method comprising delivering both a high temperature heating flame and a stream of oxidizing gas from a nozzle against one edge of said plate and below the surface thereof, to start the channeling operation at a distance below said surface substantially equal to the depth of the proposed groove; and thereupon advancing said nozzle relatively to said plate while maintaining substantially parallel to the bottom of the proposed groove that part of said stream which initially issues from the nozzle; that part of said stream more remote from the nozzle impinging against, and flowing out of the groove along, a retreating wall of metal constituting one end of the unfinished groove and inclined outwardly toward said surface and away from the nozzle, to continuously sweep out of the finished portion of the groove products of the operation as such products are formed.

8. A method of removing metal from a metal body to produce a channel therein which comprises supporting said body with the surface to be channeled downwardly disposed, heating to ignition temperature a portion of the metal to be removed, applying an oxidizing gas stream on such heated metal to effect a metal removing reaction, directing said gas stream parallel to and along the base of the channel and relatively advancing said gas stream toward the metal to be removed whereby the force of gravity assists the gas stream to deflect products of the reaction toward said surface.

9. A method of shaping edges of plates to produce a U-shaped groove for welding which comprises supporting said plates with the edges to be shaped abutting and the surfaces to which the groove walls are to extent downwardly disposed, heating to ignition temperature portions of the abutting edges to be removed, applying an oxidizing gas stream on such heated portions to effect a metal removing reaction, directing said gas stream parallel to the abuttal and substantially parallel to and along the base of the groove, and relatively advancing said gas stream toward the metal to be removed.

10. Method of removing metal from a pair of metal bodies having abutted edges united by fusion welding from one side of the abuttal which comprises, heating to ignition temperature a portion of metal to be removed on the opposite side of said abuttal, applying on such heated metal an oxidizing gas stream, relatively advancing said gas stream in the direction of said abuttal to produce a groove therealong, said gas stream being directed parallel to and along the base of the groove whereby a groove of desired depth is produced irrespective of variations in the amount of metal along the abuttal.

11. A method according to claim 10 in which the gas stream is directed at a sufficient depth below the surface of said opposite side to produce a groove exposing the weld metal.

FRANK C. GEIBIG.
WILGOT J. JACOBSSON.